United States Patent
Kim et al.

(10) Patent No.: US 9,522,994 B2
(45) Date of Patent: Dec. 20, 2016

(54) VINYL COPOLYMER HAVING HIGH HEAT RESISTANCE AND LOW-GLOSS, AND THERMOPLASTIC RESIN COMPRISING THE SAME

(71) Applicant: Samsung SDI Co., Ltd., Yongin-si (KR)

(72) Inventors: Bo Eun Kim, Uiwang-si (KR); Joo Hyun Jang, Uiwang-si (KR); Jae Won Heo, Uiwang-si (KR); Kwang Soo Park, Uiwang-si (KR); Yu Jin Jung, Uiwang-si (KR); Ki Bo Chang, Uiwang-si (KR); Young Sub Jin, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/750,006

(22) Filed: Jun. 25, 2015

(65) Prior Publication Data

US 2015/0376387 A1    Dec. 31, 2015

(30) Foreign Application Priority Data

Jun. 27, 2014  (KR) .......................... 10-2014-0080236
Oct. 17, 2014  (KR) .......................... 10-2014-0140431

(51) Int. Cl.
| | |
|---|---|
| *C08F 212/10* | (2006.01) |
| *C08L 25/12* | (2006.01) |
| *C08J 5/00* | (2006.01) |
| *C08G 77/06* | (2006.01) |
| *C08F 212/12* | (2006.01) |
| *C08G 77/00* | (2006.01) |

(52) U.S. Cl.
CPC .............. *C08L 25/12* (2013.01); *C08F 212/10* (2013.01); *C08F 212/12* (2013.01); *C08G 77/00* (2013.01); *C08G 77/06* (2013.01); *C08J 5/00* (2013.01); *C08J 2325/12* (2013.01); *C08J 2425/12* (2013.01); *C08L 2201/02* (2013.01); *C08L 2205/025* (2013.01); *C08L 2205/03* (2013.01); *C08L 2207/04* (2013.01)

(58) Field of Classification Search
None
See application file for complete search history.

(56) References Cited

U.S. PATENT DOCUMENTS

| | | | |
|---|---|---|---|
| 4,438,280 A * | 3/1984 | Monacelli | C08G 73/1067 562/457 |
| 4,659,790 A | 4/1987 | Shimozato et al. | |
| 4,757,109 A | 7/1988 | Kishida et al. | |
| 2004/0102579 A1 * | 5/2004 | Su | C08L 25/12 525/313 |

FOREIGN PATENT DOCUMENTS

GB          2010866       *  7/1979

* cited by examiner

*Primary Examiner* — Jeffrey Mullis
(74) *Attorney, Agent, or Firm* — Additon, Higgins & Pendleton, P.A.

(57) ABSTRACT

Disclosed herein are a vinyl copolymer and a thermoplastic resin composition including the same. The vinyl copolymer is prepared by copolymerization of (A) an aromatic vinyl monomer, (B) a vinyl cyanide monomer, and (C) a dimaleimide monomer.

9 Claims, No Drawings

VINYL COPOLYMER HAVING HIGH HEAT RESISTANCE AND LOW-GLOSS, AND THERMOPLASTIC RESIN COMPRISING THE SAME

CROSS-REFERENCE TO RELATED APPLICATION

This application claims the benefit under 35 USC Section 119 of Korean Patent Application No. 10-2014-0080236, filed Jun. 27, 2014, in the Korean Intellectual Property Office, and Korean Patent Application No. 10-2014-0140431, filed Oct. 17, 2014, in the Korean Intellectual Property Office, the entire disclosure of each of which is incorporated herein by reference.

FIELD OF THE INVENTION

The present invention relates to a vinyl copolymer and a thermoplastic resin composition including the same.

BACKGROUND

An acrylonitrile-butadiene-styrene (ABS) resin including styrene as a main component can have excellent properties in terms of impact resistance, mechanical strength, thermal deformation, gloss, and moldability. The ABS resin is used in various fields including electric/electronic products such as household appliances and office machinery, housings, general goods, and the like.

Recently, there is a growing interest and demand for resins capable of exhibiting both low gloss and smooth texture. Particularly, in automotive interior materials, exterior materials for electronics, and the like, which are frequently touched by hands, or remain in sight for a long time, demand for such resins is being greatly expanded. In addition, as environmental regulation is strengthened, the scope of application of low gloss resins allowing elimination of a painting process and direct molding continues to expand.

In addition, increasingly material products such as automotive interior materials, construction materials, and materials for interior decoration, are required to exhibit both low gloss and heat resistance. Such general-purpose products required to have both low gloss and heat resistance expand their market size along with quality enhancement thereof.

As a method of preparing such a heat resistant low gloss resin, particularly a heat resistant low gloss ABS resin, a method in which some components of an ABS resin are replaced by a heat resistant copolymer including a styrene monomer, an imide monomer, and the like, having good heat resistance, to enhance heat resistance of the resin while also using matting additives (matting agents), is most widely used.

For example, there is a method in which a heat resistant resin, such as an α-methylstyrene-styrene-acrylonitrile (AMS-SAN) copolymer or an N-phenylmaleimide-styrene-acrylonitrile (PMI-SAN) copolymer, and inorganic fillers, an acrylic resin or a crosslinked styrene resin for providing low gloss properties are subjected to melt extrusion along with other ABS resin raw materials, thereby preparing a heat resistant low gloss ABS resin. Alternatively, a heat resistant ABS resin is prepared using the heat resistant copolymer as set forth above, followed by post-processing to remove gloss.

In addition, there is a method wherein a micro-scaled rough surface is formed by adjusting the size of rubber particles, which are a dispersed phase of a resin, in preparation of a heat resistant ABS resin using a heat resistant copolymer. Such a micro-scaled rough surface can scatter incident light, thereby reducing gloss.

Further, as a method for further enhancing heat resistance of a heat resistant ABS resin, there is a method wherein a heat resistance copolymerized resin is prepared using α-methylstyrene (AMS) or N-phenyl maleimide (PMI), followed by melt extrusion of the heat resistant copolymerized resin together with a graft rubber having improved compatibility with a matrix of the heat resistant copolymerized resin and other additives.

However, such a melt extrusion method requires additives capable of providing low gloss properties, in addition to the heat resistance copolymerized resin, so as to realize both low gloss and enhanced heat resistance. Although using additives to realize low gloss is convenient in many ways, there is a problem in that the degree of uniformity in gloss varies depending upon dispersion of the additives, thereby causing deterioration in quality.

Moreover, since such additives generally have high specific gravity, final products also have high specific gravity. Also, the use of expensive matting agents causes unavoidable increase in production cost. Besides the aforementioned methods, injection molding through an etched mold or painting has been used to prepare a heat resistant low gloss ABS resin. However, use of the etched mold requires additional processes resulting in higher production cost, and painting can cause pollution and thus has a disadvantage in terms of environment.

When a typical crosslinking agent, i.e. a silicon compound having at least two unsaturated reactive groups, is included in a resin composition in order to overcome such problems, it is possible to achieve both low gloss and uniformity in appearance. However, since the silicon compound has the same glass transition temperature as a general aromatic vinyl-vinyl cyanide copolymer, it is necessary for the resin composition to further include a highly heat resistant copolymer so as to provide heat resistance.

SUMMARY OF THE INVENTION

Exemplary embodiments provide a vinyl copolymer and thermoplastic resin composition including the same, which can realize both low gloss and high heat resistance and also can exhibit excellent moldability when used in a resin and a molded article.

In exemplary embodiments, a vinyl copolymer prepared by copolymerization of a monomer mixture including (A) an aromatic vinyl monomer, (B) a vinyl cyanide monomer, and (C) a dimaleimide monomer is provided.

In exemplary embodiments, the vinyl copolymer may include about 55 wt % to about 80 wt % of the (A) aromatic vinyl monomer, about 15 wt % to about 40 wt % of the (B) vinyl cyanide monomer, and about 1 wt % to about 20 wt % of the (C) dimaleimide monomer.

In exemplary embodiments, the dimaleimide monomer may include a compound represented by Formula 1:

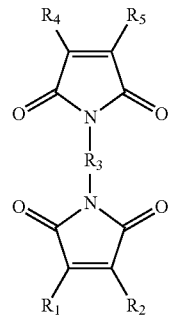

[Formula 1]

where $R_1$, $R_2$, $R_4$ and $R_5$ are the same or different and are each independently hydrogen, a substituted or unsubstituted $C_1$ to $C_{20}$ alkyl group, a substituted or unsubstituted $C_3$ to $C_{20}$ cycloalkyl group, or a substituted or unsubstituted $C_6$ to $C_{20}$ aryl group, and $R_3$ is a substituted or unsubstituted $C_1$ to $C_{20}$ substituted alkylene group, a substituted or unsubstituted $C_3$ to $C_{20}$ cycloalkylene group, or a substituted or unsubstituted $C_6$ to $C_{20}$ arylene group.

In exemplary embodiments, the monomer mixture may further include about 1 wt % to about 5 wt % of (D) a silicon compound having at least two unsaturated reactive groups.

In exemplary embodiments, the vinyl copolymer may have a glass transition temperature of about 105° C. to about 130° C.

In exemplary embodiments, the vinyl copolymer may be cross-linked.

In exemplary embodiments, a thermoplastic resin composition includes a vinyl copolymer, an aromatic vinyl-vinyl cyanide copolymer, and a graft rubber copolymer.

In exemplary embodiments, the thermoplastic resin composition may include about 10 wt % to about 40 wt % of the vinyl copolymer, about 20 wt % to about 85 wt % of the aromatic vinyl-vinyl cyanide copolymer, and about 5 wt % to about 40 wt % of the graft rubber copolymer.

In exemplary embodiments, a molded article includes the thermoplastic resin composition as set forth above.

In exemplary embodiments, the molded article may have a gloss of about 5% to about 80%, as measured at an angle of 60° in accordance with ASTM D523, and a heat resistance (VST) of about 100° C. to about 120° C., as measured under a load of 5 kg and at 50° C./hr in accordance with ISO 306B50.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

In addition, unless otherwise stated, technical and scientific terms as used herein have a meaning generally understood by those skilled in the art. Descriptions of known functions and constructions which may unnecessarily obscure the subject matter of the present invention will be omitted As used herein, unless otherwise stated, the term "(meth) acrylates" refers to "acrylates" and/or "methacrylates"; the term "(meth)acrylic acid alkyl esters" refers to "acrylic acid alkyl esters" and/or "methacrylic acid alkyl esters"; and the term "(meth)acrylic acid esters" refers to "acrylic acid esters" and/or "methacrylic acid esters".

Next, each component of the thermoplastic resin composition according to the present invention will be described in detail.

Vinyl Copolymer

In exemplary embodiments, a vinyl copolymer prepared by copolymerization of a monomer mixture including (A) an aromatic vinyl monomer, (B) a vinyl cyanide monomer, and (C) a dimaleimide monomer is provided.

(A) Aromatic Vinyl Monomer

Examples of the aromatic vinyl monomer may include without limitation styrene, $C_1$ to $C_{10}$ alkyl substituted styrene, (o, m, p)-halogen substituted styrene, (o, m, p)-vinyl toluene, (o, m, p)-methoxy styrene, vinyl naphthalene, and the like, and combinations thereof Examples of the alkyl substituted styrene may include without limitation α-methylstyrene, o-ethylstyrene, m-ethylstyrene, p-ethylstyrene, and the like, and combinations thereof.

The (A) aromatic vinyl monomer may be present in an amount of about 55 wt % to about 80 wt %, for example, about 60 wt % to about 75 wt %, based on the total weight (100 wt %) of the vinyl copolymer. In some embodiments, the (A) aromatic vinyl monomer may be present in an amount of about 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt % or 80 wt %. Further, according to some embodiments, the amount of the (A) aromatic vinyl monomer can be in a range from about any of the foregoing amounts to about any other of the foregoing amounts. Within this range, the vinyl copolymer can exhibit excellent matting properties and/or moldability while realizing high heat resistance.

(B) Vinyl Cyanide Monomer

Examples of the vinyl cyanide monomer may include without limitation acrylonitrile, methacrylonitrile, ethacrylonitrile, and the like, and combinations thereof In exemplary embodiments, the vinyl cyanide monomer may include acrylonitrile. In addition, these may be used alone or as a mixture thereof The (B) vinyl cyanide monomer may be present in an amount of about 15 wt % to about 40 wt %, for example, about 20 wt % to about 35 wt %, based on the total weight (100 wt %) of the vinyl copolymer. In some embodiments, the (B) vinyl cyanide monomer may be present in an amount of about 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt % or 40 wt %. Further, according to some embodiments, the amount of the (B) vinyl cyanide monomer can be in a range from about any of the foregoing amounts to about any other of the foregoing amounts. Within this range, the vinyl copolymer can exhibit excellent matting properties and/or moldability while realizing high heat resistance.

(C) Dimaleimide Monomer

The dimaleimide monomer may be a monomer, or mixture of monomers, including a structure represented by Formula 1:

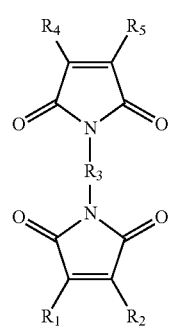

[Formula 1]

where $R_1$, $R_2$, $R_4$ and $R_5$ are the same of different and are each independently hydrogen, a substituted or unsubstituted $C_1$ to $C_{20}$ alkyl group, a substituted or unsubstituted $C_3$ to $C_{20}$ cycloalkyl group, or a substituted or unsubstituted $C_6$ to $C_{20}$ aryl group, and $R_3$ is a substituted or unsubstituted $C_1$ to $C_{20}$ alkylene group, a substituted or unsubstituted $C_3$ to $C_{20}$ cycloalkylene group, or a substituted or unsubstituted $C_6$ to $C_{20}$ arylene group.

Examples of the dimaleimide monomer may include without limitation one or more compounds represented by Formulas 2 to 7, respectively:

[Formula 2]

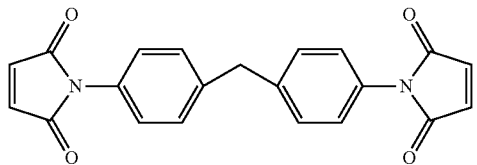

[Formula 3]

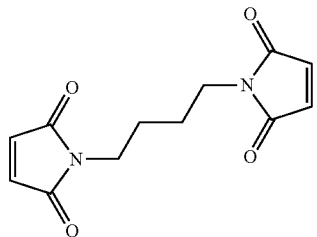

[Formula 4]

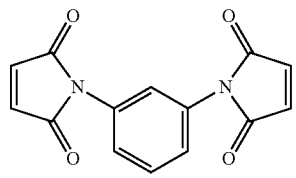

[Formula 5]

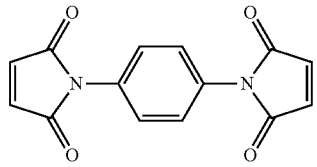

[Formula 6]

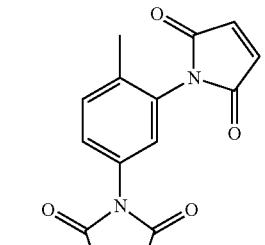

[Formula 7]

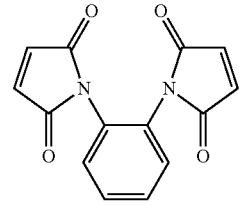

The dimaleimide monomer may include any compound so long as the compound includes the structure represented by Formula 1. In exemplary embodiments, the dimaleimide monomer can include phenylene bismaleimide, which can provide excellent matting properties and/or high heat resistance.

The (C) dimaleimide monomer may be present in an amount of about 1 wt % to about 20 wt %, for example, about 2 wt % to about 15 wt %, based on the total weight (100 wt %) of the vinyl copolymer. In some embodiments, the (C) dimaleimide monomer may be present in an amount of about 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt % or 20 wt %. Further, according to some embodiments, the amount of the (C) dimaleimide monomer can be in a range from about any of the foregoing amounts to about any other of the foregoing amounts. Within this range, the vinyl copolymer can exhibit excellent matting properties and/or moldability while realizing high heat resistance.

(D) Silicon Compound Having at Least Two Unsaturated Reactive Groups

The vinyl copolymer may further include (D) a silicon compound having at least two unsaturated reactive groups.

The (D) silicon compound having at least two unsaturated reactive groups may include one or more compounds represented by Formula 8 and/or 9.

[Formula 8]

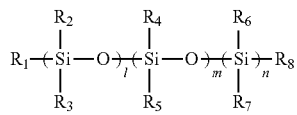

wherein l, m and n are the same or different and are each independently an integer from 0 to 100 (provided that all of l, m and n are not 0 at the same time); $R_1$, $R_2$, $R_3$, $R_4$, $R_5$, $R_6$, $R_7$ and $R_8$ are the same or different and are each independently hydrogen, a substituted or unsubstituted Chd to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group; with the proviso that at least two of $R_1$ to $R_8$ include a polymerizable unsaturated reactive group.

[Formula 9]

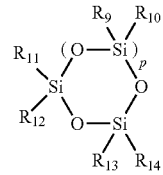

wherein $R_9$ to $R_{14}$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group; andp is an integer from 1 to 6, with the proviso that at least two of $R_9$ to $R_{14}$ include a polymerizable unsaturated reactive group.

In exemplary embodiments, the (D) silicon compound having at least two unsaturated reactive groups may include one or more compounds represented by Formula 10:

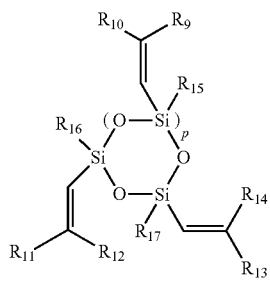
[Formula 10]

wherein $R_9$ to $R_{14}$ are the same or different and are each independently a substituted or unsubstituted $C_1$ to $C_{20}$ alkyl group, a substituted or unsubstituted $C_2$ to $C_{20}$ alkenyl group, or a substituted or unsubstituted $C_6$ to $C_{20}$ aryl group; $R_{15}$ to $R_{17}$ are the same or different and are each independently hydrogen or a substituted or unsubstituted $C_1$ to $C_6$ alkyl group; andp is an integer from 1 to 6.

As used herein, the term "substituted" means that one or more hydrogen atoms are substituted with one or more substituents, such as but not limited to one or more of a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, or a combination thereof As used herein, the term "hereto" refers to a nitrogen, sulfur, oxygen, and/or phosphorus atom in place of a carbon atom.

Examples of the (D) silicon compound having at least two unsaturated reactive groups may include without limitation 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and the like. These may be used alone or in combination thereof.

The (D) silicon compound having at least two unsaturated reactive groups may further be present in an amount of about 1 wt % to about 5 wt %, for example, about 2 wt % to about 4 wt %, based on the total weight (100 wt %) of the vinyl copolymer. In some embodiments, the (D) silicon compound having at least two unsaturated reactive groups may be present in an amount of about 1 wt %, 2 wt %, 3 wt %, 4 wt %, or 5 wt %. Further, according to some embodiments, the amount of the (D) silicon compound having at least two unsaturated reactive groups can be in a range from about any of the foregoing amounts to about any other of the foregoing amounts. Within this range, the vinyl copolymer can exhibit excellent matting properties and/or moldability while realizing high heat resistance.

In exemplary embodiments, a weight ratio of the (C) dimaleimide monomer to the (D) silicon compound having at least two unsaturated reactive groups may range from about 3:1 to about 10:1. Within this range of the weight ratio, the vinyl copolymer can achieve low gloss.

The vinyl copolymer may have a glass transition temperature of about 105° C. to about 130° C., for example, about 110° C. to about 125° C. Within this range, the vinyl copolymer can have excellent processability and/or exhibit good properties in terms of heat resistance, moisture resistance, and/or thermal shock resistance.

Thermoplastic Resin Composition

In exemplary embodiments, a thermoplastic resin composition includes the vinyl copolymer as set forth above, an aromatic vinyl-vinyl cyanide copolymer, and a graft rubber copolymer.

The thermoplastic resin composition may include the vinyl copolymer in an amount of about 10 wt % to about 40 wt %, for example, about 15 wt % to about 30 wt %, based on the total weight of the thermoplastic resin composition. In some embodiments, the vinyl copolymer may be present in an amount of about 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, or 40 wt %. Further, according to some embodiments, the amount of the vinyl copolymer can be in a range from about any of the foregoing amounts to about any other of the foregoing amounts. Within this range, the composition can advantageously prevent deterioration in resin flowability and/or exhibit enhanced thermal properties, mechanical properties and/or resin processability.

Aromatic Vinyl-Vinyl Cyanide Copolymer

The aromatic vinyl-vinyl cyanide copolymer is obtained by polymerizing a vinyl cyanide compound with an aromatic vinyl compound. The aromatic vinyl compound may include the (A) aromatic vinyl monomer, i.e. at least one of styrene, $C_1$ to $C_{10}$ alkyl substituted styrene, (o,m,p)-halogen substituted styrene, (o,m,p)-vinyl toluene, (o,m,p)-methoxystyrene, vinyl naphthalene, and the like, and combinations thereof. Further, examples of the alkyl substituted styrene may include without limitation α-methylstyrene, o-ethylstyrene, m-ethylstyrene, p-ethylstyrene, and the like, and combinations thereof.

The vinyl cyanide compound may include the (B) vinyl cyanide monomer, i.e. at least one of acrylonitrile, methacrylonitrile, ethacrylonitrile, and the like, and combinations thereof, for example acrylonitrile. These may be used alone or as a mixture thereof, without being limited thereto.

In the aromatic vinyl-vinyl cyanide copolymer, a content (weight) ratio of the aromatic vinyl to the vinyl cyanide may be about 20 wt % to about 80 wt %:about 40 wt % to about 60 wt %, for example, about 30 wt % to about 70 wt %:about 45 wt % to about 55 wt %.

In some embodiments, the aromatic vinyl-vinyl cyanide copolymer may include the aromatic vinyl in an amount of about 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt % or 80 wt %. Further, according to some embodiments, the amount of the aromatic vinyl can be in a range from about any of the foregoing amounts to about any other of the foregoing amounts.

In some embodiments, the aromatic vinyl-vinyl cyanide copolymer may include the vinyl cyanide in an amount of about 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt % or 60 wt %. Further, according to some embodiments, the amount of the vinyl cyanide can be in a range from about any of the foregoing amounts to about any other of the foregoing amounts.

Within this range of the content ratio, the resin composition can have excellent chemical resistance and/or exhibit good balance between properties such as rigidity, flowability, and the like.

The thermoplastic resin composition may include the aromatic vinyl-vinyl cyanide copolymer in an amount of about 20 wt % to about 85 wt %, for example, about 30 wt % to about 75 wt %, based on the total weight (100 wt %) of the thermoplastic resin composition. In some embodiments, the thermoplastic resin composition may include the aromatic vinyl-vinyl cyanide copolymer in an amount of about 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, or 85 wt %. Further, according to some embodiments, the amount of the aromatic vinyl-vinyl cyanide copolymer can be in a range from about any of the foregoing amounts to about any other of the foregoing amounts.

Within this range, the composition can advantageously prevent deterioration in resin flowability and/or exhibit enhanced thermal properties, mechanical properties and/or resin processability.

Graft Rubber Copolymer

The graft rubber copolymer may be prepared by grafting an aromatic vinyl compound and a vinyl cyanide compound to conjugated diene rubber latex.

As the conjugated diene rubber latex, typical butadiene rubber latex or styrene-butadiene copolymerized rubber latex may be used, without being limited thereto. The conjugated diene rubber latex may have an average particle diameter of about 0.1 µm to about 5.0 µm, for example, about 0.5 µm to about 4.0 µm. Within this range of the average particle diameter, the resin composition can have excellent chemical resistance and proper tensile strength, and can be prevented from suffering deterioration in impact strength.

The graft copolymer can include the conjugated diene rubber latex in an amount of about 5 wt % to about 70 wt %, for example, about 10 wt % to about 60 wt %, based on the total weight (100 wt %) of the graft copolymer. Within this range, the resin composition can maintain sufficient impact resistance and thus exhibit proper mechanical properties and excellent resin processability.

Examples of the aromatic vinyl compound may include without limitation styrene, $C_1$ to $C_{10}$ alkyl substituted styrene, halogen substituted styrene, vinyl toluene, vinyl naphthalene, and the like, and combinations thereof Examples of the alkyl substituted styrene may include without limitation α-methylstyrene, o-ethylstyrene, m-ethylstyrene, p-ethylstyrene, and the like, and combinations thereof.

Examples of the vinyl cyanide compound may include without limitation acrylonitrile, methacrylonitrile, ethacrylonitrile, and the like, and combinations thereof, for example, acrylonitrile.

The graft copolymer may be prepared from the above components by a typical method, for example, emulsion polymerization, suspension polymerization, solution polymerization, or mass polymerization. For example, the graft copolymer may be emulsion polymerized or mass polymerized using a polymerization initiator in the presence of the above components.

The graft rubber copolymer may contain rubber in an amount of about 5 wt % to about 40 wt %, for example, about 10 wt % to about 30 wt %. Within this range, the resin composition can be prevented from suffering deterioration in properties such as flowability, heat resistance, and/or impact resistance at room temperature, and production costs thereof can be maintained at a proper level.

The thermoplastic resin composition may include the graft rubber copolymer in an amount of about 5 wt % to about 40 wt %, for example, about 10 wt % to about 35 wt %, based on the total weight (100 wt %) of the thermoplastic resin composition. In some embodiments, the thermoplastic resin composition may include the graft rubber copolymer in an amount of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, or 40 wt %. Further, according to some embodiments, the amount of the graft rubber copolymer can be in a range from about any of the foregoing amounts to about any other of the foregoing amounts.

Within this range, the resin composition can advantageously prevent deterioration in resin flowability and/or exhibit enhanced thermal properties, mechanical properties and/or resin processability.

The thermoplastic resin composition may include one or more additives such as dyes, pigments, flame retardants, fillers, stabilizers, lubricants, antimicrobial agents, release agents, antistatic agents, antioxidants, and the like, to further provide moldability, balance between properties, and the like. These additives may be used alone or as a mixture thereof, without being limited thereto.

Molded Article

In exemplary embodiments, a molded article includes the thermoplastic resin composition as set forth above.

Since the molded article exhibits both desired low gloss characteristics and high heat resistance and has similar mechanical properties to existing molded articles, the molded article can be used for electronics, housings, and the like.

According to exemplary embodiments, the molded article may have a melt index (MI) of about 5 g/10 min to about 25 g/10 min, for example, about 5.5 g/10 min to about 10 g/10 min, as measured under conditions of 220° C./10 kg.

In addition, the molded article may have a gloss of about 5% to about 80%, for example, about 5% to about 50%, and as another example about 5% to about 45%, as measured at 60° in accordance with ASTM D523.

The molded article may have a Vicat softening temperature (VST) of about 100° C. to about 120° C. as measured on a ¼" thick specimen under conditions of 5 kgf and 50° C./hr in accordance with ISO 306B50. Within this range, the molded article can exhibit both desired low gloss characteristics and high heat resistance.

Hereinafter, the present invention will be described in more detail with reference to the following examples. It should be understood that these examples are provided for illustration only and are not to be construed in any way as limiting the present invention.

EXAMPLES

Details of components used in the following Examples and Comparative Examples and property evaluation methods are as follows.

TABLE 1

| | Component | Note |
|---|---|---|
| (A) | Aromatic vinyl monomer | Styrene (Samsung Total) |
| (B) | Vinyl cyanide monomer | Acrylonitrile (Samsung Total) |
| (C) | Dimaleimide monomer | Phenylene bismaleimide (Aldrich) |
| (C') | Maleimide monomer | N-phenylmaleimide (Aldrich) |
| (D) | Silicon compound having at least two unsaturated reactive groups | Vinyl D4 (98%, SKC SILICONE) |
| Y | Aromatic vinyl-vinyl cyanide copolymer | Styrene: Acrylonitrile = 76:24 (wt %), Mw: 150 (Cheil Industries) |
| Z | Graft rubber copolymer | Styrene: Acrylonitrile = 76:24 (wt %), rubber content: 58 wt %, styrene + acrylonitrile: 42 wt %, average particle diameter: 2,580 Å (Cheil Industries) |

Examples 1 to 3 and Comparative Examples 1 to 2

The above components are polymerized in amounts as listed Table 2, thereby preparing vinyl copolymers. Each of the prepared vinyl copolymer is measured as to weight average molecular weight and glass transition temperature by the following methods. Results are shown in Table 2.

TABLE 2

| | (X) vinyl copolymer (wt %) | | | | Properties of copolymer Weight average molecular weight (g/mol) | Tg (° C.) |
|---|---|---|---|---|---|---|
| | (A) | (B) | (C) | (C') | (D) | | |
| Example 1 | 71.3 | 23.7 | 5 | — | — | Insoluble | 114.8 |
| Example 2 | 67.5 | 22.5 | 10 | — | — | Insoluble | 119.5 |
| Example 3 | 71.4 | 22.6 | 5 | — | 1 | Insoluble | 114.6 |
| Comparative Example 1 | 75.0 | 25.0 | — | — | — | 149,100 | 104.6 |
| Comparative Example 2 | 71.3 | 23.8 | — | — | 5 | Insoluble | 105.6 |

20 wt % of the prepared vinyl copolymer, 55 wt % of the aromatic vinyl-vinyl cyanide copolymer (styrene:acrylonitrile=76:24 (wt %), Mw: 150 (Cheil Industries)), and 25 wt % of the graft rubber copolymer (styrene:acrylonitrile=76:24 (wt %), rubber content: 58 wt %, styrene+acrylonitrile: 42 wt %, average particle diameter: 2,580 Å (Cheil Industries)) are mixed to prepare a thermoplastic resin composition, which in turn is subjected to extrusion, thereby preparing a thermoplastic resin in the form of pellets. Here, extrusion is performed using a 29 L/D twin-screw extruder having a diameter of 45 mm at a barrel temperature of 230° C. The prepared pellets are dried at 80° C. for 2 hours, followed by injection molding using a 6 oz. injection machine at a cylinder temperature of 240° C. and a mold temperature of 60° C., thereby preparing a specimen for property evaluation having a size of 9 cm×5 cm×0.2 cm. The prepared specimen is evaluated as to the following properties, and results are shown in Table 3.

TABLE 3

| | Properties of compound | | | |
|---|---|---|---|---|
| | IZOD (1/8") | MI (220° C./10 kg) | VST (° C.) | Gloss (60°) |
| Example 1 | 10.0 | 7.8 | 103.5 | 40 |
| Example 2 | 7.6 | 5.5 | 106.1 | 21 |
| Example 3 | 7.1 | 7.6 | 102.9 | 15 |
| Comparative Example 1 | 23.1 | 14.8 | 99.5 | 93 |
| Comparative Example 2 | 19.6 | 4.9 | 101.7 | 30 |

Property Evaluation (1) Weight Average Molecular Weight (Unit: g/mol)

Weight average molecular weight is measured using gel permeation chromatography (GPC; Agilent Technologies 1200 series) after dissolving a powdery sample in tetrahydrofuran (THF). Here, a Shodex LF-804 (8.0.1.D.×300 mm) is used as a column and polystyrene (Shodex Co., Ltd.) is used as a standard sample.

(2) Glass Transition Temperature (Unit: ° C.)

Using a calorimeter (Q2910, TA Instruments), the prepared specimen is heated to 160° C. at a rate of 20° C./min and then slowly cooled to 50° C. to maintain equilibrium, followed by heating to 160° C. at a rate of 10° C./min. An inflection point on an obtained endothermic transition curve is determined as a glass transition temperature.

(3) Gloss (Surface Gloss) (Unit: %)

Gloss at an angle of 60° is measured using a BYK-Gardner gloss meter (BYK Co., Ltd.) in accordance with ASTM D523.

(4) Izod Impact Strength (Unit: kgf·cm/cm)

Izod impact strength is measured on 1/8" thick notched specimens in accordance with ASTM D256.

(5) Melt-Flow Index (MI)

Melt-flow index is measured under conditions of 220° C./10 kg in accordance with ASTM D1238. A measurement unit is g/10 min.

(6) Vicat Softening Temperature (VST) (Unit: ° C.)

Vicat softening temperature is measured on 1/4" thick specimens under conditions of 5 kgf and 50° C./hr in accordance with ISO 306B50.

The vinyl copolymers prepared in Examples 1 to 3 are insoluble due to a crosslinking structure thereof and thus did not allow measurement of the weight average molecular weight, and have a glass transition temperature of up to 119.5° C. The specimens obtained by compounding each of the vinyl copolymers with the aromatic vinyl-vinyl cyanide copolymer (SAN) and the graft rubber copolymer (g-ABS) are evaluated as to the aforementioned properties.

As a result, it can be seen than the specimens of Examples 1 to 3 exhibit desired impact resistance and have a Vicat softening temperature of up to 106.1° C., and thus achieve high heat resistance while providing excellent melt flowability and matting properties.

Conversely, it can be seen that, unlike Examples 1 to 3, the vinyl copolymers of Comparative Examples 1 to 2 did not include the dimaleimide monomer, and thus exhibit low glass transition temperature. In addition, the specimens prepared using the vinyl copolymers did not provide matting properties, or exhibit too low melt flow index and thus poor moldability. Thus, it can be seen that all of the specimens prepared in Comparative Examples exhibit considerably poor heat resistance.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

What is claimed is:

1. A vinyl copolymer prepared by copolymerization of a monomer mixture comprising (A) an aromatic vinyl monomer, (B) a vinyl cyanide monomer, (C) a dimaleimide monomer, and about 1 wt % to about 5 wt % of (D) a silicon compound having at least two unsaturated reactive groups.

2. The vinyl copolymer according to claim 1, comprising: about 55 wt % to about 80 wt % of the (A) aromatic vinyl monomer, about 15 wt % to about 40 wt % of the (B) vinyl cyanide monomer, and about 1 wt % to about 20 wt % of the (C) dimaleimide monomer.

3. The vinyl copolymer according to claim 1, wherein the dimaleimide monomer comprises a compound represented by Formula 1:

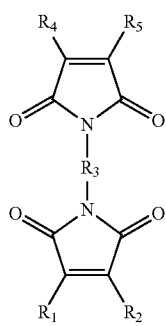

[Formula 1]

wherein $R_1$, $R_2$, $R_4$ and $R_5$ are the same or different and are each independently hydrogen, a substituted or unsubstituted $C_1$ to $C_{20}$ alkyl group, a substituted or unsubstituted $C_3$ to $C_{20}$ cycloalkyl group, or a substituted or unsubstituted $C_6$ to $C_{20}$ aryl group, and $R_3$ is a substituted or unsubstituted $C_1$ to $C_{20}$ alkylene group, a substituted or unsubstituted $C_3$ to $C_{20}$ cycloalkylene group, or a substituted or unsubstituted $C_6$ to $C_{20}$ arylene group.

4. The vinyl copolymer according to claim 1, wherein the vinyl copolymer has a glass transition temperature of about 105° C. to about 130° C.

5. The vinyl copolymer according to claim 1, wherein the vinyl copolymer is cross-linked.

6. A thermoplastic resin composition comprising:

the vinyl copolymer according to claim 1;

an aromatic vinyl-vinyl cyanide copolymer; and a graft rubber copolymer.

7. The thermoplastic resin composition according to claim 6, comprising:

about 10 wt % to about 40 wt % of the vinyl copolymer;

about 20 wt % to about 85 wt % of the aromatic vinyl-vinyl cyanide copolymer; and about 5 wt % to about 40 wt % of the graft rubber copolymer.

8. A molded article comprising the thermoplastic resin composition according to claim 6.

9. The molded article according to claim 8, wherein the molded article has a gloss of about 5% to about 80%, as measured at an angle of 60° in accordance with ASTM D523, and a heat resistance (VST) of about 100° C. to about 120° C., as measured under a load of 5 kg and at 50° C./hr in accordance with ISO 306B50.

* * * * *

UNITED STATES PATENT AND TRADEMARK OFFICE
CERTIFICATE OF CORRECTION

PATENT NO. : 9,522,994 B2  
APPLICATION NO. : 14/750006  
DATED : December 20, 2016  
INVENTOR(S) : Bo Eun Kim et al.

Page 1 of 1

It is certified that error appears in the above-identified patent and that said Letters Patent is hereby corrected as shown below:

In the Specification

Column 6, delete Line 37 and insert: --independently hydrogen, a substituted or unsubstituted $C_1$--

Column 7 delete Line 2 and insert: --and p is an integer from 1 to 6, with the proviso that at least--

Column 7 delete Line 29 and insert: --alkyl group; and p is an integer from 1 to 6.--

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*